United States Patent
Choi et al.

(10) Patent No.: US 6,409,983 B1
(45) Date of Patent: Jun. 25, 2002

(54) PROCESS FOR PREPARING CRYSTALLINE BARIUM TITANATE POWDER

(75) Inventors: Guang Jin Choi; Kyungja Woo; Young Sang Cho; Sang Jun Sim; Young Dae Kim, all of Seoul; Sang Kyun Lee, Euijeongbu, all of (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/614,160

(22) Filed: Jul. 11, 2000

(51) Int. Cl.[7] .............................. C01G 23/00; C01F 1/00
(52) U.S. Cl. ....................................... 423/598
(58) Field of Search ......................... 423/598

(56) References Cited

U.S. PATENT DOCUMENTS 4,670,243 A * 6/1987 Wilson et al.

OTHER PUBLICATIONS

Choi et al., "BaTiO3 particles prepared by microwave . . . ", Materials Letters, 41, 1999, pp. 122–7.*

Choi et al., "Characteristics of BaTiO3 Particles Prepared by . . . " Chem. Mater., 10(12), 1998, pp. 4104–4113.*

* cited by examiner

Primary Examiner—Steven Bos
(74) Attorney, Agent, or Firm—Scully, Scott Murphy & Presser

(57) ABSTRACT

The present invention provides a process of preparing barium titanate powders having fine particle morphology and superior crystallinity, by preparing a sol precursor by using a titanium acylate and a barium compound, spraying the sol precursor in a strong alkaline solution for coprecipitation, crystallizing the barium titanate with an optional hydrothermal reaction, and purifying the barium titanate powder by washing.

5 Claims, 3 Drawing Sheets

PROCESS FOR PREPARING CRYSTALLINE BARIUM TITANATE POWDER

BACKGROUND OF THE INVENTION

1. Field of the Invention

The present invention relates to a process for preparing ultrafine crystalline barium titanate powder having a small particle size and a spherical shape to be used as a main constituent in the preparation process of MLCC (multilayer ceramic capacitor), filters and other components for the next generation microwave communication equipments.

2. Description of the Background Art

Barium titanate, expressed chemically as $BaTiO_3$, is a ferroelectric material having a Perovskite structure. $BaTiO_3$ has been used as the main raw material for MLCC, filters, thermistors and varistors due to its extremely high dielectric constant, relatively cheap price, and high thermal stability. Recently, electronic or communication devices have become more sophisticated and denser. The techniques of preparing powder with superior crystallinity, purity and small particle size is industrially very meaningful since current development trend is focused on miniaturizing the size of the products while increasing the performance. For example, devices prepared with barium titanate powder of a smaller particle size tend to show a lower failure rate and higher dielectric constant due to the smaller grain structure. Therefore, smaller number of layers are needed thus increasing the efficiency of the raw materials. In addition, less energy and costs are required since lower temperature is needed to sinter for dense nanocrystals. Moreover, it is well believed that the MLCC, filters and other devices, which are prepared with ultrafine powders, would also have an excellent capability also in the microwave range for next generation communication.

Generally, barium titanate powders are produced commercially by two different methods. A solid-state reaction method has been well known since the early days. In this method, titanium oxide and barium carbonate powders are mixed and reacted at high temperatures (over 1000° C.) to produce barium titanate powders. Since this method has an advantage in that the production cost of barium titanate is low, it has been mainly used commercially. However, the minimum size of the powder is around 1 micron for the solid-state reaction at high temperatures, and the morphology of the particle is also heterogeneous. Therefore, it is not suitable for devices with an aim of miniturization.

Another method is the oxalate precipitate method that has been becoming more popular these days in the United States. This method is a simple chemical synthesis and has an advantage of high yields. However, It is not easy to control the size and the degree of particle aggregation to a desirable level. Since the stability of barium/titanium oxalate is high, it requires high temperature thermal treatment to produce highly crystalline barium titanate. Therefore, the mean particle size of the final particles is at least 0.5 micron.

SUMMARY OF THE INVENTION

Accordingly, an object of the present invention is to provide a method of manufaturing barium titanate particles. It is another object of the present invention to provide a process for reducing the particle size and increasing the crystallinity of barium titanate compared to those manufactured by the conventional solid state reaction method or the oxalate method.

BRIEF DESCRIPTION OF THE DRAWINGS

The present invention will become better understood with reference to the accompanying drawings which are given only by way of illustration and thus are not limiting of the present invention, wherein.

DETAILED DESCRIPTION OF THE INVENTION

Figure 1:
FIG. 1 is a scanning electron microscopy photograph of barium titanate powders prepared according to the process in Example 1 of the present invention.

The present invention provides a process for preparing crystalline barium titanate powder by first preparing a sol precursor by mixing titanium acylate and a barium compound, spraying the sol precursor in a strong alkaline solution for coprecipitation, crystallizing the barium titanate with an optional hydrothermal reaction, and purifying the barium titanate powder by washing.

The above crystallization process of the present invention can be carried out by the conventional hydrothermal reaction, by a hydrothermal reaction while applying energy by heat or microwave, or by changing the conditions of the above coprecipitation step for simultaneous crystallization. Namely, the process of the present invention can be carried out with or without an additional hydrothermal reaction to produce spherically shaped and highly fine crystalline barium titanate powders, for instance, having an average particle diameter of 20~60 nm.

Titanium acylate of the present invention can be prepared by using titanium alkoxide compound as a raw material, and by controlling the conditions to stabilize the sol state in the sol precursor mixture solution and to maintain an optimal hydrolysis rate. In other words, titanium alkoxide by itself can be rarely used to prepare high quality barium titanate because it gels in an aqueous solution. Therefore, an alkoxide group of the titanium alkoxide is substituted with a carboxylic anion ($RCO_2^-$, i.e., $OAc^-$) by treating it with carboxylic acid, whereby the hydrolysis rate can be maintained at a minimal level in an aqueous state, and as a result, the produced sol solution can be stabilized without gelation.

In particular, to achive a stable sol precursor mixture solution of the present invention, it is important to substitute a portion of titanium alkoxide compounds with a carboxylic anion. If all of the alkoxide groups are substituted with carboxylic anion, it is also impossible to produce high quality barium titanate powder. Herein, the partially substituted titanium alkoxide with carboxylate anion is referred to as titanium acylate. The degree of the substitution with carboxylic anion can be measured by nuclear magnetic resonance analysis.

In preparing titanium acylate used in the present invention, various carboxylic acids, preferably acetic acid, can be used. In the case acetic acid is used, optimum titanium acylate for the present invention can be prepared by using about 4~7 equivalent, preferable about 7 equivalent to the amount of the titanium alkoxide. The reaction temperature is preferably in the range of 30~50° C., and the reaction time is preferably in the range of 2~5 hours.

Barium salt which can be used in the present invention includes barium chloride ($BaCl_2$), barium acetate ($Ba(OAc)_2$), barium nitrate ($Ba(NO_3)_2$) and barium hydroxide ($Ba(OH)_2$). Unlike the titanium acylate, barium salt compounds are not sensitive to hydrolysis, and therefore, water or organic solvents including alcohol can be used to prepare a solution. It is also possible to prepare sol precursor mixture solution, which can be easily sprayed, by mixing the barium salt solution with the above titanium acylate at a certain mole ratio. An excess amount of barium salt can be used, and in this case, the mole ratio between titanium and barium of thusby resulted barium titanate can be accomplished to ca. 1, therefore producing a product with excellent properties.

Spraying of the sol precursor mixture solution is performed by using an prepared apparatus comprising a pump, a spray nozzle and a flow rate controller etc. The pump and the flow rate controller can be selected according to the desired producing rate. The spray nozzle is preferably a two-flow nozzle, and the size of the nozzle hole is preferably less than 100 microns. According to the results obtained by the present inventors, fine particles can be produced by using a smaller sized nozzle. A carrier gas which provides the necessary pressure for spraying can be selected from the gas with low reactivity with the sol solution, such as nitrogen.

The coprecipitation bath is composed of a strong alkaline solution. The composition of the alkaline solution can change the characteristics of the prepared barium titanate to a certain degree, but a more important factor is the pH of the alkaline solution. If the pH is too low, the precipitation efficiency of the sprayed sol solution is too low. It is, therefore, preferable to maintain the pH of the solution to be higher than 13. Especially, if the pH of the coprecipitation solution is maintained higher than 14, precipitation and crystallization can occur simultaneously. In this case, an additional hydrothermal reaction is not needed to obtain the crystallized barium titanate powder. The coprecipitation bath is preferably made of the materials that do not corrode in a strong alkaline solution.

Coprecipitation in the present invention means that the precipitation of titanium acylate and barium precursor compound occurs simultaneously as they contact with a strong alkaline solution. The precipitation efficiency of the precursor compounds can change according to the concentration and volume of the alkaline solution or the temperature of the solution. The above conditions, therefore, can be adjusted according to the desired efficiency. Especially, if the temperature of this alkaline solution is high, for instance in the range of 80~100° C., precipitation and crystallization can also occur simultaneously. In this case, an additional hydrothermal reaction is not needed to obtain the crystallized barium titanate powder. Besides, in order to prevent aggregation of the precipitated powder in the solution and to induce coprecipitation in the steady state, it is preferable to stir the coprecipitation bath. Here, the mixture of the precipitate and the resultant alkaline solution, which is obtained by undergoing only the coprecipitation process will be referred to as the precipitate solution.

After sufficiently stirring the obtained precipitate solution, it can be transferred to an autoclave reactor which is resistant to alkaline environment, and then, a hydrothermal reaction can be performed under an appropriate condition. The hydrothermal reaction can take place by many different types of energy, for instance, an electrical heating or a microwave heating. It is preferable to control the various processing conditions of the hydrothermal reaction such as the temperature and reaction time depending on the degree of the reaction and aggregation.

According to the results of the present invention, in the case of an electrical heating, it is preferable that the reaction time be in the range of 30 minutes and 3 hours, and the reaction temperature be in the range of 100~160° C. In the case of the hydrothermal reaction using microwave, it is preferable to control the reaction time to 5~30 minutes. In this case, the reactor must be made of a material that absorbs microwave as little as possible. In all cases, a vigorous agitation is required during the reaction to obtain uniform powders through a hydrothermal reaction.

As described above, in the case coprecipitation of the sol precursor mixture solution is carried out in an alkaline solution exceeding pH 14, highly crystalline barium titanate can be obtained by a coprecipitation reaction only at room temperature without the hydrothermal reaction. In the present invention, the mixture of barium titanate powder and the resultant alkaline solution, which is obtained by undergoing only the coprecipitation process or coprecipitation and hydrothermal reaction together, will be referred to as the powder solution.

Powder is separated from the prepared powder solution by an appropriate method. In the case of a centrifugal method, it is preferable to perform at 3,000~12,000 rpm.

A washing process can be carried out several times to remove all the impurities such as metal ions or hydrophilic compounds which remain in the prepared barium titanate powder. In the washing process, distilled water or a dilute solution containing other additives may be used. It is preferable to use an additive that can maintain the pH of the solution around 10~11 and that does not influence the total composition such as barium hydroxide or ammonia water.

It is preferable to perform a drying process to remove the remaining water from the barium titanate powder. The drying process can be carried out by placing the powder in a drying oven, set to an appropriate temperature. In this case, if the drying temperature is too low, the removal rate of water is too low and if set too high, aggregation between the fine powders can occur. Therefore, it is preferable to carry out the drying process in a temperature range of 50~150° C.

Various characteristics of the final barium titanate powder obtained through the above drying process can be measured by a variety of analytical methods. For example, methods including scanning electron microscope (SEM), X-ray diffraction (XRD), infrared spectroscopy (IR), BET, Raman spectroscopy and thermogravimetric analysis (TGA).

The present invention will be further illustrated by the following examples. It should be understood that these examples are intended to be illustrative only and the present invention is not limited to the conditions, materials or devices recited therein.

EXAMPLE 1

Titanium isopropoxide (0.1 mole) and 7 equivalent weights of glacial acetic acid were mixed and reacted for 3 hours at 40° C. To maximize the reaction efficiency, the mixture was vigorously agitated during the reaction. The produced titanium acylate solution was mixed with a small amount of distilled water to induce partial hydrolysis. The solution became transparent after stabilizing it for an appropriate amount of time. After mixing the titanium acylate solution with a barium acetate solution, the mixture was stirred and stored.

The produced sol mixture solution was sprayed into a coprecipitation bath containing KOH solution at a pH of 13.5 at room temperature using a spray equipment. Thereafter, the solution was left to precipitate the barium titanate. The obtained precipitate solution was transferred to a hydrothermal synthesis reactor lined with PTEE (polytetrafluoroethylene). After the hydrothermal reaction, the powder solution was obtained, and then, the powders were collected by a centrifugation. The centrifuge was set to 8,000 rpm. The powder was washed many times and dried in an oven set at 120° C.

Figure 2:
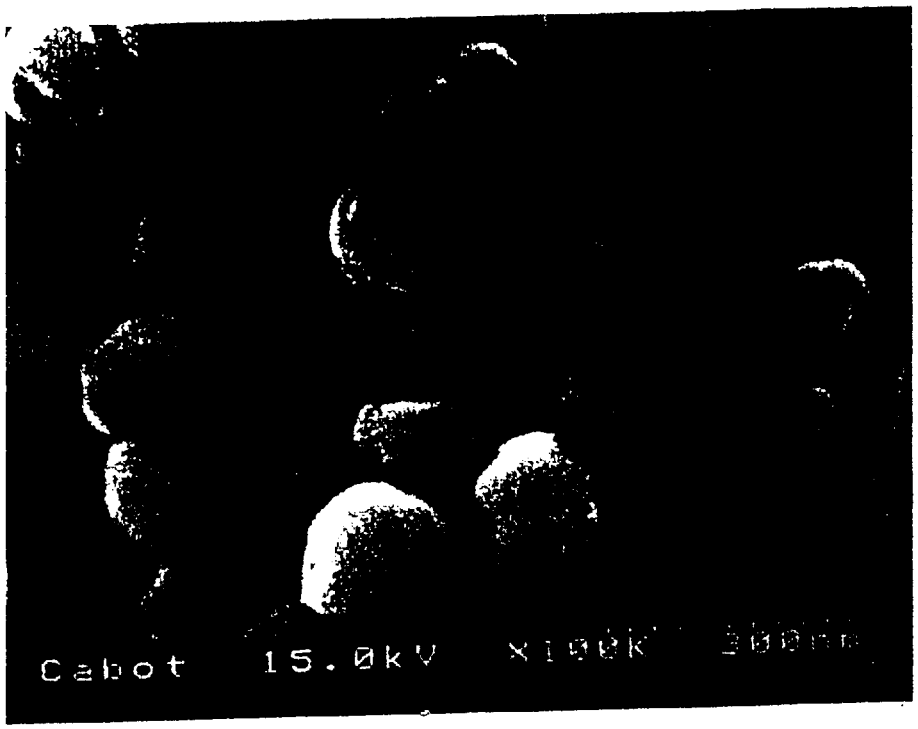
FIG. 2 is a scanning electron microscopy photograph of a commercially available barium titanate powder prepared via the hydrothermal route of the prior art.
Figure 3:
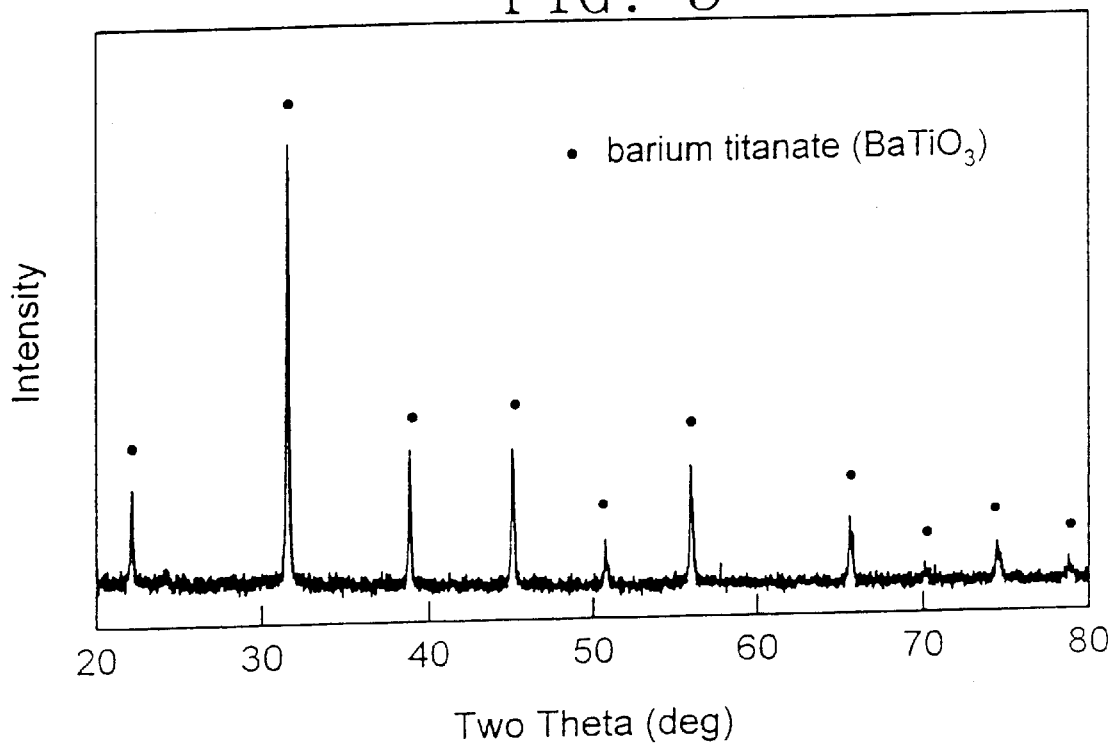
FIG. 3 is an X-ray diffraction spectrum of barium titanate powders prepared according to the process in Example 1 of the present invention.

The obtained barium titanate powder was analyzed by using a scanning electron microscope. The powder had a very fine particulate structure as shown in FIG. 1. When compared with a commercially available barium titanate powder prepared by a hydrothermal reaction as shown in FIG. 2, the mean particle diameter of the particles prepared according to the present invention was 20~30 nm, which is much smaller than from the commercial product of 200 nm. Also, the powder contained pure barium titanate crystals as shown by X-ray diffraction spectrum in FIG. 3.

EXAMPLE 2

Barium titanate powder was prepared and purified by using the identical experimental conditions as in Example 1 except that 0.15 mole of barium acetate was used instead of 0.1 mole.

Figure 4:
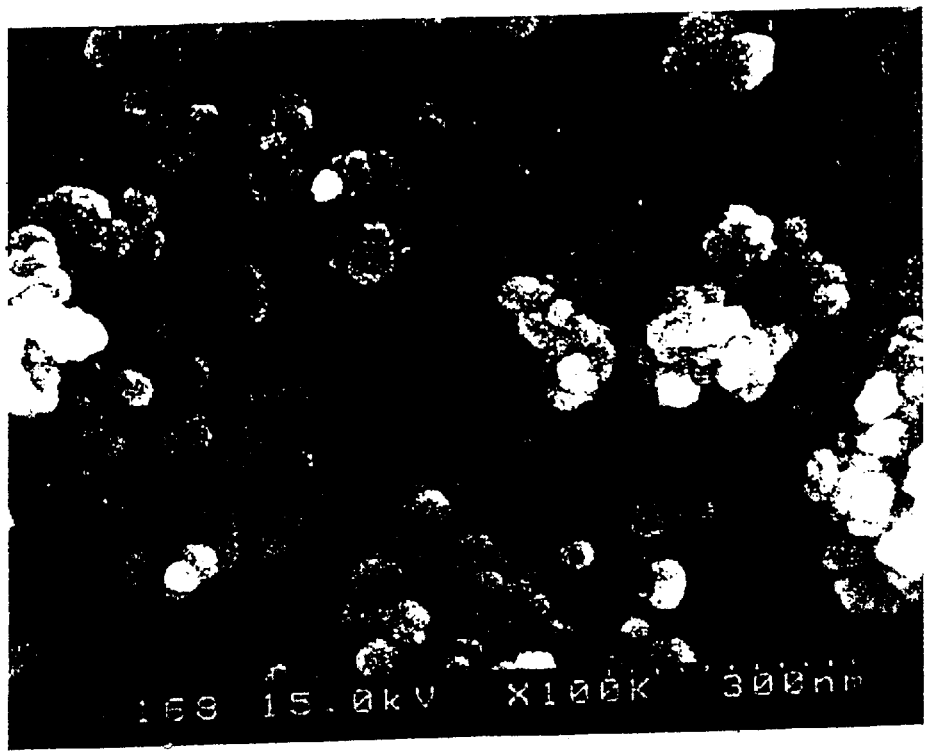
FIG. 4 is a scanning electron microscopy photograph of barium titanate powders prepared by using an excess amount of barium salt according to the process of the present invention.

The obtained barium titanate powder was analyzed by using a scanning electron microscope. The powder had a very fine particulate structure when compared to a commercial product. Also, as shown in FIG. 4, the mean particle diameter can be reduced by adding an excess amount of the barium compound. Also, the powder had a highly crystallized barium titanate and did not contain crystals other than the pure barium titanate crystals.

According to the present example, it is shown that the ratio between barium and titanium of the final product can be controlled to 1:1 by adding the excessive the barium compound to the titanium compound.

EXAMPLE 3

The process up to the coprecipitation step was performed by using the identical experimental conditions as in Example 1 except that the temperature of the coprecipitation bath comprising a strong alkaline solution was set to and maintained at 100° C. In the present example, since the crystallization reaction of barium titanate occured simultaneously with the coprecipitation in the high temperature coprecipitation bath, it has an added advantage in that a separate hydrothermal reaction with an autoclave etc. is not necessary.

Similar to Example 1, the powder had a very fine particulate structure when compared to a commercial product. Also, the powder has a highly crystallized barium titanate and did not contain crystals other than the pure barium titanate crystals as indicated by X-ray diffraction.

EXAMPLE 4

The process up to the coprecipitation step was performed by using the identical experimental conditions as in Example 1 except that the coprecipitation bath comprised a strong alkaline solution having a pH grater than 14. In the present example, since the crystallization reaction of barium titanate occured simultaneously with the coprecipitation in the coprecipitation bath, it has an added advantage in that a separate hydrothermal reaction with an autoclave etc. is not necessary. The crystallinity of the obtained barium titanate was achieved to a sufficient level. An additional hydrothermal reaction may not be as effective in enhancing the crystallinity of synthesized powders.

Similar to Example 1, the powder had a very fine particulate structure when compared to a commercial product. Also, the powder has a highly crystallized barium titanate and did not contain crystals other than the pure barium titanate crystals as indicated by X-ray diffraction.

EXAMPLE 5

Barium titanate powder was prepared and purified by using the identical experimental conditions as in Example 1 except that microwave at a frequency of 2.45 GHz was used as an energy source during the hydrothermal reaction, and a Teflon reactor was used accordingly.

Figure 5:
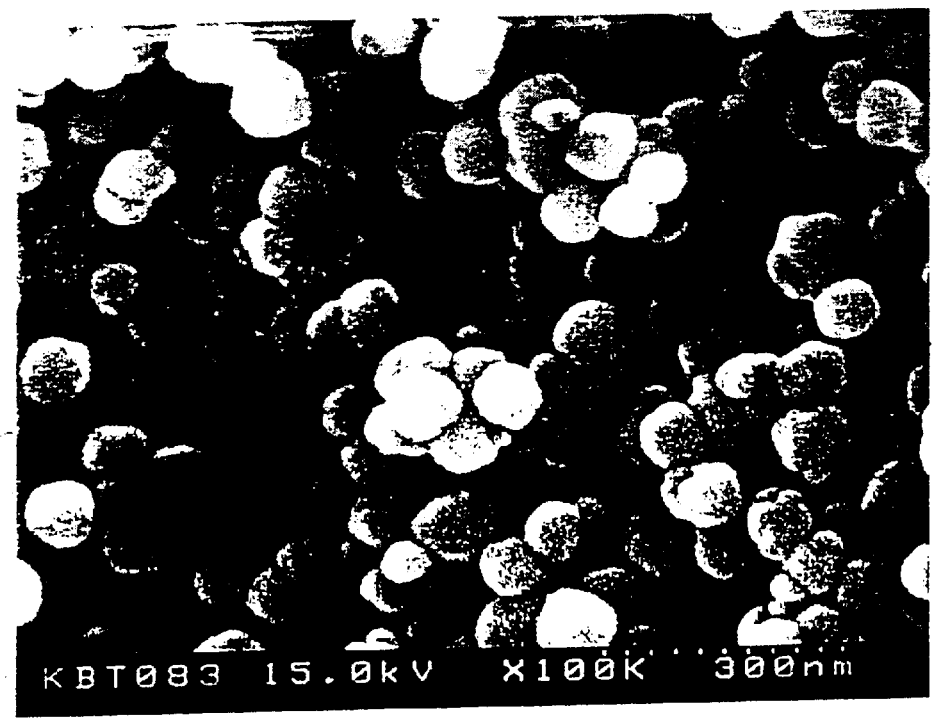
FIG. 5 is a scanning electron microscopy photograph of barium titanate powders prepared by performing a hydrothermal reaction with microwave according to the process in Example 5 of the present invention.
Figure 6:
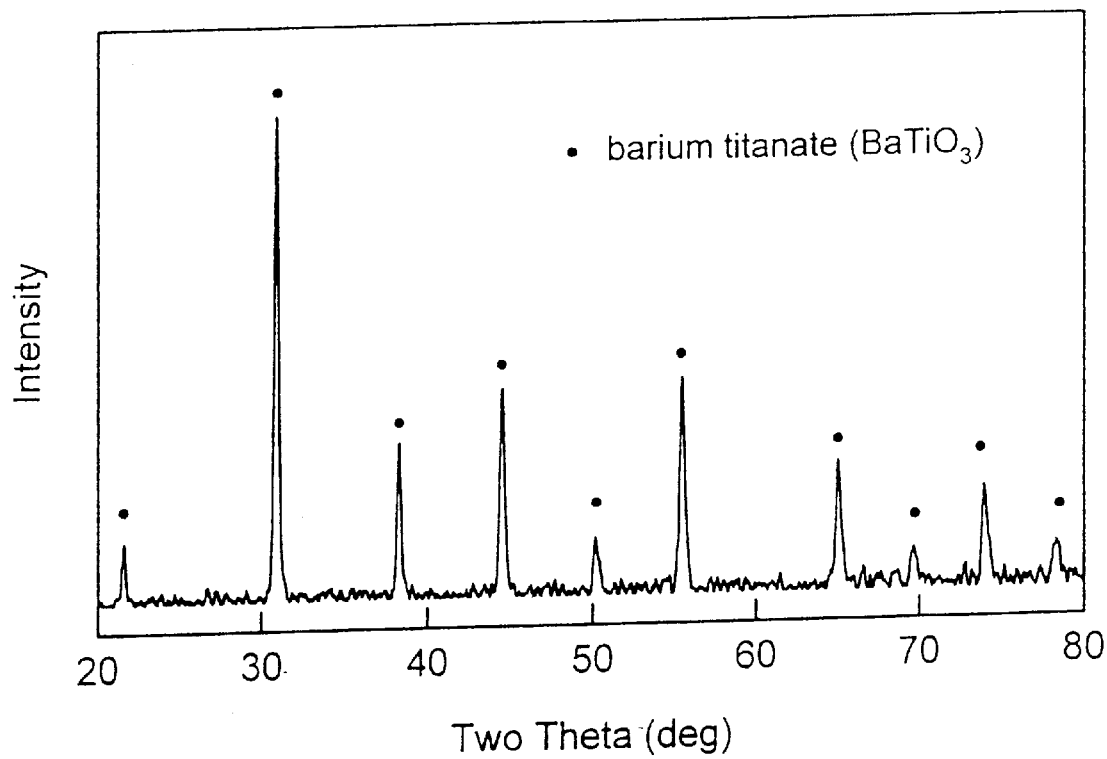
FIG. 6 is an X-ray diffraction spectrum of barium titanate powders prepared according to the process in Example 5 of the present invention.

The barium titanate powder synthesized by using microwave was analyzed by using a scanning electron microscope as shown in FIG. 5. The particles had a mean particle diameter of 50~60 nm, was nearly mono-dispersed and spherically shaped. Also, the particle coagulation was negligible. The powder was highly crystallized and did not contain crystals other than the pure barium titanate, as shown by x-ray diffraction spectrum in FIG. 6.

Although the present embodiment of the present invention have been disclosed for illustrative purpose, those skilled in the art will appreciate that various modification, addition and substitutions are possible, without departing from the scope and spirit of the invention as recited inp(the accompanying claims.

What is claimed is:

1. A process for preparing crystalline barium titanate powder comprising: preparing a sol precursor by mixing a titanate acylate and a barium compound, wherein said titanium acylate is prepared by a liquid substitution reaction between a titanium alkoxide and about 4 to 7 equivalents of acetic acid per equivalent of said titanium alkoxide, and said barium compound is selected from the group consisting of barium chloride, barium acetate, barium nitrate and barium hydroxide; spraying the thereby produced sol precursor with an alkaline solution having a pH of greater than 14 effectuating coprecipitation; and, thereby, simultaneously crystallizing, without a hydrothermal reaction, a highly crystalline barium titanate powder; and purifying said barium titanate powder by washing with a dilute aqueous ammonia solution or a dilute aqueous barium hydroxide solution.

2. The process for preparing crystalline barium titanate powder according to claim 1 wherein said titanium alkoxide is selected from the group consisting of titanium methoxide, titanium ethoxide, titanium propoxide and titanium butoxide.

3. The process for preparing crystalline barium titanate powder according to claim 1, wherein the barium compound added is used in excess to the equivalent of the titanium acylate.

4. The process for preparing crystalline barium titanate powder according to claim 1, wherein a particle diameter of the produced barium titanate powder is 20~60 nm.

5. The process of preparing crystalline barium titanate powder according to claim 1 wherein said liquid substitution reaction between said titanium alkoxide and said acetic acid includes about 7 equivalents of said acetic acid per equivalent of said titanium alkoxide.

\* \* \* \* \*